(12) United States Patent
Klingberg

(10) Patent No.: US 8,153,072 B2
(45) Date of Patent: Apr. 10, 2012

(54) HYDROLYSIS CATALYST WITH LARGER DUCT CROSS-SECTIONS IN THE PERIPHERAL PORTION THAN IN THE CENTRAL PORTION, AND METHOD FOR HYDROLYSIS OF A URIC SUBSTANCE

(75) Inventor: Thomas Klingberg, Södertälje (SE)

(73) Assignee: Scania CV AB (Publ) (SE)

( * ) Notice: Subject to any disclaimer, the term of this patent is extended or adjusted under 35 U.S.C. 154(b) by 379 days.

(21) Appl. No.: 12/564,314

(22) Filed: Sep. 22, 2009

(65) Prior Publication Data
US 2010/0071346 A1   Mar. 25, 2010

(30) Foreign Application Priority Data
Sep. 23, 2008 (SE) ...................................... 0850019

(51) Int. Cl.
*B01D 50/00* (2006.01)
*F01N 3/00* (2006.01)
*F01N 3/10* (2006.01)

(52) U.S. Cl. ............ 422/177; 422/183; 60/274; 60/295; 60/301

(58) Field of Classification Search ................... 422/177, 422/180, 183; 60/274, 295, 301
See application file for complete search history.

(56) References Cited

U.S. PATENT DOCUMENTS

| 3,853,485 | A | * | 12/1974 | Hogan | 502/300 |
|---|---|---|---|---|---|
| 4,233,311 | A | * | 11/1980 | Kramer et al. | 514/399 |
| 4,810,554 | A | * | 3/1989 | Hattori et al. | 428/116 |
| 5,985,224 | A | | 11/1999 | Lagana | |
| 6,173,568 | B1 | | 1/2001 | Zürbig et al. | |
| 6,902,599 | B2 | * | 6/2005 | Bardon | 55/523 |
| 7,244,284 | B2 | * | 7/2007 | Miwa et al. | 55/523 |
| 7,807,250 | B2 | * | 10/2010 | Beall et al. | 428/116 |

FOREIGN PATENT DOCUMENTS

| DE | 19913462 | 9/2000 |
|---|---|---|
| EP | 0907010 | 4/1999 |
| EP | 1052009 | 11/2000 |

* cited by examiner

*Primary Examiner* — Tom Duong
(74) *Attorney, Agent, or Firm* — Ostrolenk Faber LLP

(57) ABSTRACT

A hydrolysis catalyst forming part of an exhaust system for a combustion engine for catalytically converting a uric substance to ammonia which can be used in a downstream SCR catalyst. The hydrolysis catalyst includes an active catalyst element with a central portion and a surrounding peripheral portion, both of which are lined with the same catalyst material. To ensure that injected urea, or other uric substance, which can become crystallized, does not cause blockages in the catalyst, the cross-sectional areas of separate ducts in the peripheral portion are larger than the cross-sectional areas of the separate ducts in the central portion. A method for hydrolysis of a uric substance by use of the catalyst and directing flow through the ducts of the peripheral portion upon blockage of ducts in the central portion.

19 Claims, 1 Drawing Sheet

HYDROLYSIS CATALYST WITH LARGER DUCT CROSS-SECTIONS IN THE PERIPHERAL PORTION THAN IN THE CENTRAL PORTION, AND METHOD FOR HYDROLYSIS OF A URIC SUBSTANCE

CROSS REFERENCE TO RELATED APPLICATION

This application claims priority from Swedish Application No. 0850019-1, filed on Sep. 23, 2008.

BACKGROUND OF THE INVENTION

The present invention relates to a hydrolysis catalyst intended for use in a combustion engine, particularly as part of an exhaust system, and more particularly to an improved construction of the hydrolysis catalyst.

A known practice in combustion engines is for the exhaust gases to be treated by various post-treatment systems with the object of reducing the proportion of harmful constituents in the exhaust gases. A known way of reducing the proportion of nitrogen oxides is to use an SCR catalyst in which ammonia being mixed with the exhaust gases makes it possible to reduce the nitrogen oxides to nitrogen gas and water. To avoid injecting pure ammonia into the exhaust gases, what is used instead is a more easily handled substance, usually a uric substance, such as an aqueous solution of urea, which when injected into the exhaust gases is converted first to ammonia which thereafter reacts with the nitrogen oxides in the SCR catalyst. A known practice with a view to facilitating the conversion of urea to ammonia is to use a hydrolysis catalyst in which urea is converted to ammonia and carbon dioxide before these are led into a downstream SCR catalyst. An example of such a solution is described in EP 0907010.

A problem which arises in the injection of an aqueous solution of urea is that it readily crystallises if it encounters cold surfaces. With a view to preventing this, there are various solutions intended to ensure that the injected urea is at a sufficiently high temperature when it is introduced into the SCR catalyst and/or prevent contact with cold surfaces in the exhaust line. When the exhaust temperature rises, crystallised urea will certainly be dissolved but may, before that happens, cause blockages in the exhaust line or other serious operational malfunctions.

Even if it is not absolutely necessary to use a hydrolysis catalyst before the SCR catalyst, it affords advantages in ensuring better conversion of urea to ammonia and supporting the intended function of the SCR catalyst. However, a problem which is particularly evident during low-load operation is that urea crystallises and obstructs the ducts in the hydrolysis catalyst.

In the state of the art there are solutions which describe how a bypass line is provided to lead exhaust gases past a hydrolysis catalyst. For example, EP 1052009 refers to a solution with a bypass line so arranged that only a partial flow of exhaust gases passes the hydrolysis catalyst. The result is that the urea in the exhaust gases which pass through the hydrolysis catalyst reacts better and more completely converts the urea to ammonia. The amount of exhaust gases led through the bypass line is controlled under the influence of a damper device on the basis of detected engine parameters such as exhaust flow, exhaust velocity and/or exhaust pressure. The fact that this device comprises a number of additional components makes this a solution which is both bulky and expensive.

A requirement for satisfactory functioning of a hydrolysis catalyst is that the uric substance is completely allowed to be converted to ammonia and carbon dioxide. Even if it is possible to lengthen the dwell time in the catalyst in the manner described in the aforesaid EP 1052009, its active surface needs to be sufficiently large. In practice this is achieved by providing as many cell walls as possible within a limited region, which leads to the ducts bounded by these walls having relatively small cross-sectional areas. This unfortunately leads to the possibility that the pressure drop across a hydrolysis catalyst may be considerable.

A further requirement for a hydrolysis catalyst to function in an intended manner is that it reaches an intended operating temperature. This entails reduction of its functioning during warm-up and during low-load running, which may be catered for by, for example, external warming by electrical means. This involves the disadvantage that the necessary additional components occupy space and that the costs increase.

SUMMARY OF THE INVENTION

The object of the present invention is to propose a significantly less expensive and simpler way than known solutions of preventing blockages or other operational malfunctions in an exhaust line containing a hydrolysis catalyst which are caused by crystallisation of injected urea or other uric substance.

In accordance with the invention, this is achieved by the hydrolysis catalyst forming part of an exhaust system for a combustion engine for catalytically converting a uric substance to ammonia which can be used in a downstream SCR catalyst. The hydrolysis catalyst includes a first active catalyst element configured for example with a central portion and a second surrounding peripheral portion, both of which are lined with a catalyst element, preferably the same catalyst material. To ensure that injected urea, or other uric substance, which can become crystallised, does not cause blockages in the catalyst, the cross-sectional areas of separate ducts in the peripheral portion are larger than the cross-sectional areas of the separate ducts in the central portion. More broadly, the ducts aspect of the invention comprises first ducts of relatively smaller cross-section and second ducts of relatively larger cross-section. The invention further concerns a method for hydrolysis of a uric substance by use of the catalyst and directing flow through the ducts of the peripheral portion upon blockage of ducts in the central portion.

Providing the catalyst element with ducts with different cross-sectional areas makes it possible for the exhaust flow to pass through the hydrolysis catalyst even if the exhaust flow contains urea which crystallises and consequently causes a greater or lesser degree of blockage in the ducts of smaller cross-sectional area. A blockage caused by crystallised urea in the ducts of smaller cross-sectional area will thus allow the exhaust flow to continue to pass through the ducts which are of larger cross-sectional area, and continued hydrolysis will also be facilitated by the fact that these ducts are lined with catalyst material. When the temperature of the exhaust gases has reached a sufficiently high level, the crystals will gradually be dissolved and the ducts of smaller cross-sectional area will again allow the exhaust gases to pass. Passage through the various portions of the catalyst element is thus regulated entirely automatically with no need for valves or the like.

According to an advantageous embodiment, the total cross-sectional area of the peripheral ducts is equal to the cross-sectional area of the outlet from the container which accommodates the hydrolysis catalyst. This means that even when the ducts with smaller cross-sectional areas are blocked, the exhaust flow will be able to pass without major counter-pressure.

According to an advantageous embodiment, the ducts with larger cross-sectional areas are turned in their axial extent, e.g., are spiralled along the axial direction. The result is a rotating exhaust flow which improves the mixing of the exhaust gases and ammonia which is converted in the hydrolysis catalyst, which improvement is advantageous for the functioning of the downstream SCR catalyst.

Further features and advantages distinguishing the invention are indicated by the following description of an example of an advantageous embodiment.

BRIEF DESCRIPTION OF THE DRAWINGS

A preferred embodiment of the invention is described below by way of example with reference to the attached drawing, in which.

DETAILED DESCRIPTION OF A PREFERRED EMBODIMENT OF THE INVENTION

Figure 1:
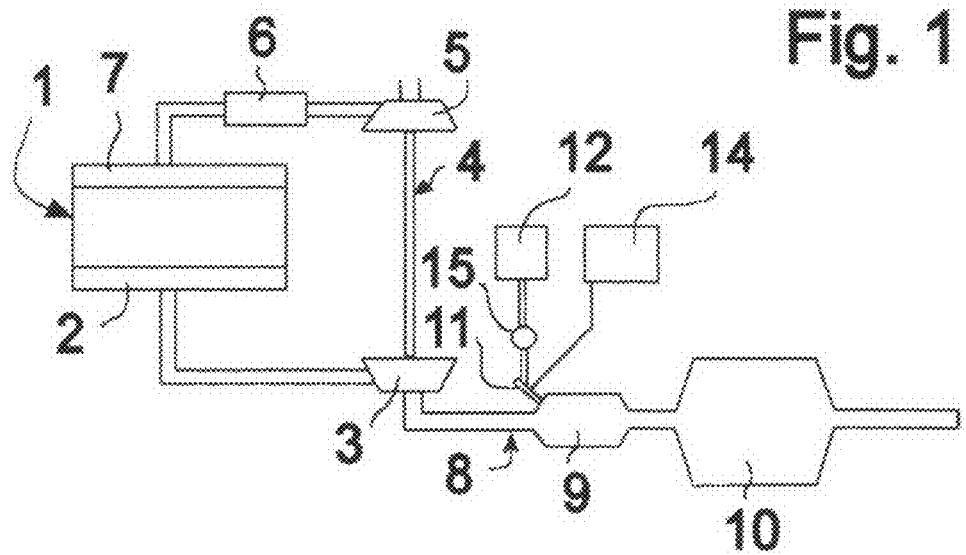
FIG. 1 depicts schematically a combustion engine and its exhaust system.

FIG. 1 depicts schematically an exhaust system for a multi-cylinder combustion engine 1, e.g. a diesel engine used to power a heavy vehicle. On the exhaust side of the engine 1, there is an exhaust manifold 2 from which the exhaust gases are first led to an exhaust turbine 3 which forms part of a turbocompressor 4 which also comprises a compressor 5 for supercharging of inlet air to the engine. The engine's inlet air is led from the compressor 5 to the engine 1 via a charge air cooler 6 and an inlet manifold 7. After the exhaust gases have passed through the turbine 3, they are led in an exhaust line 8 to a hydrolysis catalyst 9 and an SCR catalyst 10 before proceeding on in the exhaust line 8 to an undepicted silencer. A valve 11 is provided immediately upstream of the hydrolysis catalyst 9 for the injection of a suitable uric substance, which in this example takes the form of urea, into the hydrolysis catalyst 9 from a container 12 provided for the purpose. The valve 11 is connected to a control unit 14 which controls the injection of the amount of urea on the basis of various detected engine parameters. To provide a suitably high pressure for the injection, the line between the container 12 and the valve 11 comprises a pump 15.

Figure 2:
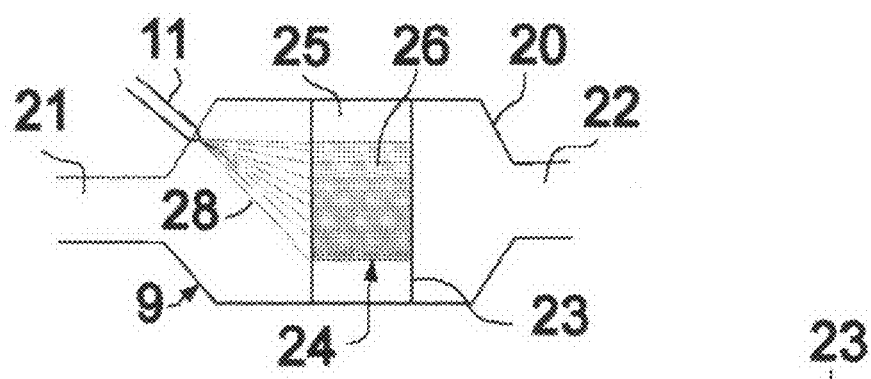
FIG. 2 depicts in a longitudinal section a hydrolysis catalyst which forms part of the exhaust system.
Figure 3:
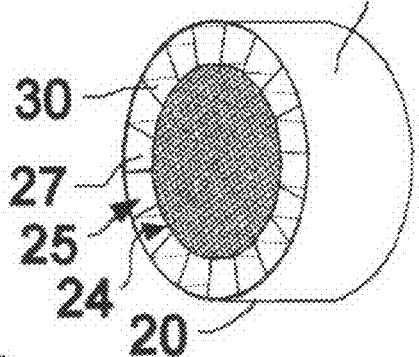
FIG. 3 depicts an active catalyst element which forms part of the hydrolysis catalyst.

FIG. 2 and FIG. 3 both depict in more detail the configuration of the hydrolysis catalyst 9. The hydrolysis catalyst is adapted in a conventional manner to converting urea to ammonia which in a likewise conventional manner is used for conversion of nitrogen oxides in the downstream SCR catalyst 10.

The hydrolysis catalyst comprises a separate cylindrical container 20 with an inlet 21 and an outlet 22. The active element 23 of the hydrolysis catalyst is arranged axially and centrally in the container and comprises a central cylindrical portion 24 and a peripheral annular portion 25, both of which are lined with the same active catalyst material. The central portion 24 comprises a plurality of ducts 26 running axially, each of which is of relatively small cross-sectional area. This makes it possible for there to be a large surface for effective conversion of urea. The radial extent of the central portion 24 is of substantially the same order of magnitude as the inlet 21 and the outlet 22, both of which are of the same diameter.

The peripheral portion 25 also comprises a plurality of ducts 27 which run axially but are of substantially greater cross-sectional area than the ducts 26 in the central portion 24. These ducts 27 are significantly fewer than the number of ducts 26 in the central portion 24. The total cross-sectional area of the annular peripheral portion 25 is of the same order of magnitude as the total cross-sectional area of the central portion 24 and hence also of the same order of magnitude as the inlet 21 and the outlet 22 from the hydrolysis catalyst's container 20. The inlet 21 to and the outlet 22 from the hydrolysis catalyst's container 20 are with advantage cylindrical and have the same cross-sectional shape and the same cross-sectional surface. With advantage, the peripheral portion 25 is arranged concentrically about the central portion 24, as depicted in FIG. 2 and FIG. 3.

As an example of a suitable dimensional relationship, it may be mentioned that the cross-sectional area of the central ducts 26 is of the order of 0.01-0.30 cm2, with advantage about 0.025 cm2, whereas the order of magnitude of the peripheral ducts 27 is of the order of 0.9-2 cm2, with advantage about 1 cm2. This applies with a hydrolysis catalyst whose container 20 has a diameter of the order of 10-20 cm, with advantage about 15 cm. The cross-sectional area of the ducts in the peripheral portion 25 is thus of the order of at least three times larger than the ducts in the central portion 24, but with advantage about 40 times larger.

FIG. 2 depicts the valve 11 for injection of urea and the resulting jet pattern 28. The valve 11 is largely situated outside the hydrolysis catalyst's container 20 and only a nozzle of it protrudes into the container 20. The nozzle is configured to result in a conical jet pattern 28 of injected urea and the jet pattern is so directed that substantially all of the injected urea reaches the inlet to the central portion 24.

FIG. 3 shows the ducts 27 in the peripheral portion 24 somewhat turned relative to their axial extents. This turning is of the order of 5 degrees. FIG. 3 also shows that the size of ducts 27 in the peripheral portion 25 is such that in the radial direction only one duct is accommodated between the central portion 24 and the periphery of the container 20. The intermediate walls 30 between the peripheral ducts 27 take the form of planar walls which are provided with said turning so that the ducts 27 serve as guide rails which bring about the rotated flow when the exhaust gases have passed through the ducts 27.

The functioning of the arrangement depicted is as follows. During normal operation of the engine 1, urea is injected into the flow of exhaust gases from the engine according to the jet pattern 28 depicted in FIG. 2 and is converted in a known manner to ammonia and carbon dioxide. The exhaust flow and the mixed-in ammonia are thereafter led on in the exhaust line 8 to the SCR catalyst 10 for conversion of the nitrogen oxides in the exhaust gases to nitrogen gas and water.

Should the engine 1 for any reason be run at low load or in other operating circumstances which result in low exhaust temperatures, there is risk of the injected amount of urea or parts of it being crystallised. The result is a high probability that the crystals will totally or partly block the central ducts 26 in the hydrolysis catalyst's central portion 24. However, the cross-sectional areas of the peripheral ducts 27 are significantly larger, with the result that the exhaust flow can pass through the hydrolysis catalyst 9 even if it contains crystallised urea. The fact that the total annular area of the peripheral portion 25 is of the same order of magnitude as the inlet 21 and the outlet 22 makes it possible for the exhaust flow to pass without appreciable resistance through the hydrolysis catalyst 9. The fact that the catalyst's peripheral portion 25 is lined with catalyst material makes it possible for at least certain parts of urea injected to be converted to ammonia, thereby allowing the SCR catalyst 10 to function with only a limited degree of reduction of functionality. The fact that the ducts 27 in the peripheral portion 25 are somewhat turned in their axial extent that is, in a slightly spiral orientation along the axial direction of the catalyst, means that the exhaust flow passing through them acquires a rotation which makes it easier for the exhaust gases to mix with the ammonia.

When the temperature of the exhaust gases of the engine 1 has reached more normally high values, e.g. during high-load running, the crystallised urea will gradually be dissolved by the heat, and the blocking of the ducts 26 in the central portion 24 of the hydrolysis catalyst will gradually cease The peripheral portion 25 of the catalyst serves not only as a bypass line past the ducts 26 of the central portion 24 but will also have, because of the catalyst lining, a continuing, albeit somewhat limited, hydrolysis catalyst function. This function will also be self-regulating, with no need for any valve or control means for leading the exhaust flow through the central portion 24 or the peripheral portion 25 of the catalyst. During normal operation of the engine, when none of the injected urea is crystallised, a certain proportion of the exhaust gases will nevertheless pass through the peripheral portion 25 and will, because of these ducts being turned, result in a rotating exhaust flow. This means that the exhaust gases after the hydrolysis catalyst are mixed well with exhaust gases which contain ammonia converted from the urea, a fact which is advantageous for achieving good functioning of the downstream SCR catalyst 10. The peripheral ducts 27 also cause the exhaust gases passing through the central ducts 26 to have a somewhat longer dwell time in the catalyst, thereby creating good conditions for the respective chemical reactions to take place for conversion of urea to ammonia. Alternatively, they make it possible for the hydrolysis catalyst to be configured with relatively smaller dimensions than would otherwise be necessary The invention may within the scope of the claims set out below be modified and configured in different ways than what is indicated in the example described above. Instead of configuring the hydrolysis catalyst 9 and the SCR catalyst 10 as separate units connected to one another, these two catalysts may instead be accommodated in the same container. However, it is of advantage if they are not situated too close to one another, to ensure that the converted ammonia becomes well mixed in the exhaust flow before the resulting mixture is led into the SCR catalyst.

The above description indicates that it is urea which is converted in the hydrolysis catalyst, since this is the substance most commonly used for the intended function. However, the invention is also applicable in cases where other aqueous solutions of uric substances are used for conversion to ammonia.

The example indicates that the turning or spiral angle of the peripheral ducts is 5 degrees, which has been found to be advantageous, but in alternative versions it might be between 3 and 10 degrees.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A hydrolysis catalyst configured for use in an exhaust system of a combustion engine, and operable for catalytic conversion of a uric substance to ammonia for use in another downstream SCR catalyst, the hydrolysis catalyst comprising
a container with an engine exhaust gas inlet and an exhaust gas outlet, an active catalyst element accommodated in the container
a valve configured to inject the uric substance into an exhaust flow from the engine, upstream, in the exhaust flow from the engine, of the active catalyst element,
the active catalyst element comprising a central portion and a peripheral portion around the central portion, and each portion being comprised of a respective plurality of ducts passing through the catalyst chamber between the inlet and the outlet; the ducts being lined with a catalyst material operable for catalytic conversion of a uric substance to ammonia; cross-sectional areas of the separate ducts in the peripheral portion are larger than cross-sectional areas of the separate ducts in the central portion.

2. A hydrolysis catalyst according to claim 1, further comprising the respective cross-sectional areas of the separate ducts in the peripheral portion are at least 40 times larger than the respective cross-sectional areas of the separate ducts in the central portion.

3. A hydrolysis catalyst according to claim 2, further comprising the cross-sectional areas of the separate ducts in the peripheral portion are equal to or greater than 0.9 cm2.

4. A hydrolysis catalyst according to claim 3, further comprising the cross-sectional areas of the separate ducts in the central portion are equal to or smaller than 0.3 cm2.

5. A hydrolysis catalyst according to claim 2, further comprising in the cross-sectional areas of the separate ducts in the central portion are equal to or smaller than 0.3 cm2.

6. A hydrolysis catalyst according to claim 1, wherein the total cross-sectional area of all of the ducts in the central portion is about equal to the total cross-sectional area of all of the ducts in the peripheral portion.

7. A hydrolysis catalyst according to claim 1, wherein the total cross-sectional area of all of the ducts in the peripheral portion is about equal to the cross-sectional area of the outlet of the container.

8. A hydrolysis catalyst according to claim 1, wherein the ducts in the peripheral portion are turned along their axial extent for achieving a rotating flow of exhaust gases which pass through the ducts in the peripheral portion.

9. A hydrolysis catalyst according to claim 8, wherein the turning of the ducts in the peripheral portion is between 3 and 10 degrees.

10. A hydrolysis catalyst according to claim 8, wherein the turning of the ducts in the peripheral portion is 5 degrees.

11. A hydrolysis catalyst according to claim 1, wherein the uric substance comprises an aqueous solution of urea.

12. A hydrolysis catalyst according to claim 1, wherein the valve is configured to inject the uric substance in the form of a flow with a cone-shaped jet pattern and to so direct the flow that the entire injected flow reaches an inlet to the ducts in the central portion.

13. A hydrolysis catalyst according to claim 1, wherein the peripheral portion is annular and concentric about the central portion.

14. A method of using a hydrolysis catalyst according to claim 1, comprising leading the exhaust flow containing injected uric substance both through the ducts in the central portion of the catalyst element and through the ducts in the peripheral portion of the catalyst element.

15. The method according to claim 14, wherein the injection of the uric substance from the valve is only towards the ducts in the central portion.

16. The method according to claim 14, further comprising in the event of obstruction or hindrance to the flow in the ducts in the central portion, leading the exhaust gases through the ducts in the peripheral portion.

17. A hydrolysis catalyst according to claim 1, wherein the ducts of the central portion of the second portion are lined with a same catalyst material.

18. A hydrolysis catalyst configured for use in an exhaust system of a combustion engine, and operable for catalytic conversion of a uric substance to ammonia for use in another downstream SCR catalyst, the hydrolysis catalyst comprising
   a container with an engine exhaust gas inlet and an exhaust gas outlet, an active catalyst element accommodated in the container
   a valve configured to inject the uric substance into an exhaust flow from the engine, upstream, in the exhaust flow from the engine, of the active catalyst element,
   the active catalyst element comprising a first portion and a second portion and each portion being comprised of a respective plurality of ducts passing through the catalyst chamber between the inlet and the outlet; the ducts being lined with a catalyst material operable for catalytic conversion of a uric substance to ammonia; cross-sectional areas of the separate ducts in the second portion are larger than cross-sectional areas of the separate ducts in the first portion.

19. A hydrolysis catalyst according to claim 18, wherein the total cross-sectional area of all of the ducts in the first portion is about equal to the total cross-sectional area of all of the ducts in the second portion.

* * * * *